A. C. RUTZEN.
MULTIPLE SPRING POWER MACHINE.
APPLICATION FILED OCT. 16, 1915.

1,178,952.

Patented Apr. 11, 1916.
5 SHEETS—SHEET 1.

ATTEST:
F. C. Harrold.

INVENTOR
A. C. RUTZEN
By Fisher & more
ATT'YS

A. C. RUTZEN.
MULTIPLE SPRING POWER MACHINE.
APPLICATION FILED OCT. 16, 1915.

1,178,952.

Patented Apr. 11, 1916.
5 SHEETS—SHEET 2.

ATTEST.
F.C. Harrold

INVENTOR.
A.C. RUTZEN.

BY Fisher & Moser ATT'YS.

A. C. RUTZEN.
MULTIPLE SPRING POWER MACHINE.
APPLICATION FILED OCT. 16, 1915.

1,178,952.

Patented Apr. 11, 1916.
5 SHEETS—SHEET 3.

ATTEST
F.C. Harrold

INVENTOR.
A.C. RUTZEN.
BY Fisher & Moser ATT'YS.

THE COLUMBIA PLANOGRAPH CO., WASHINGTON, D. C.

A. C. RUTZEN.
MULTIPLE SPRING POWER MACHINE.
APPLICATION FILED OCT. 16, 1915.

1,178,952.

Patented Apr. 11, 1916.
5 SHEETS—SHEET 4.

ATTEST.
F. C. Harrold.

INVENTOR.
A. C. RUTZEN
By Fisher & Moser ATTYS.

A. C. RUTZEN.
MULTIPLE SPRING POWER MACHINE.
APPLICATION FILED OCT. 16, 1915.

1,178,952.

Patented Apr. 11, 1916.
5 SHEETS—SHEET 5.

ATTEST.
J.C. Herrold.

INVENTOR.
A.C. RUTZEN

By Fisher & Moser ATT'YS.

UNITED STATES PATENT OFFICE.

AUGUST C. RUTZEN, OF CLEVELAND, OHIO.

MULTIPLE-SPRING-POWER MACHINE.

1,178,952.  Specification of Letters Patent. Patented Apr. 11, 1916.

Application filed October 16, 1915. Serial No. 56,212.

*To all whom it may concern:*

Be it known that I, AUGUST C. RUTZEN, a citizen of the United States, residing at Cleveland, in the county of Cuyahoga and State of Ohio, have invented certain new and useful Improvements in Multiple-Spring-Power Machines, of which the following is a specification.

Figure 1:
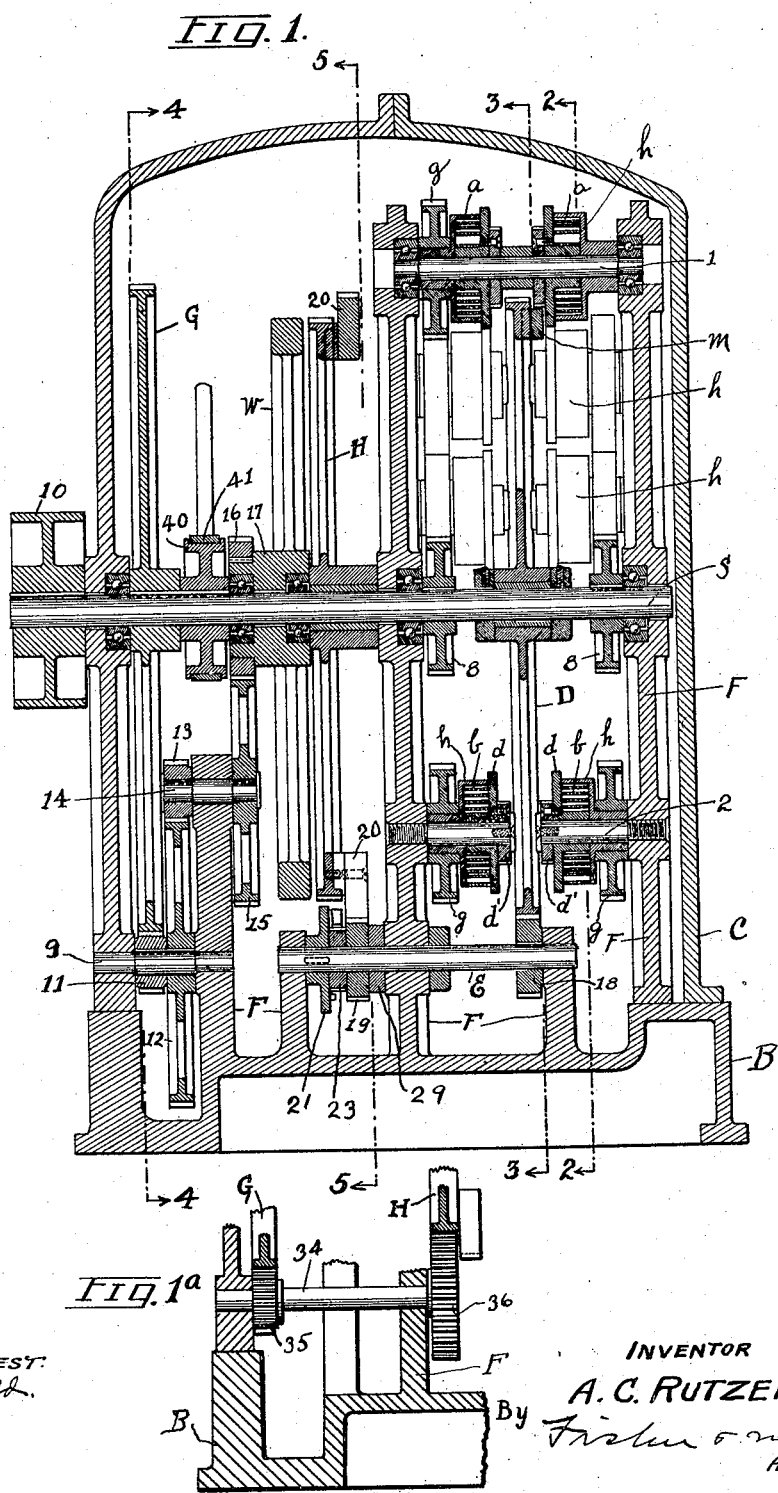
Figure 2:
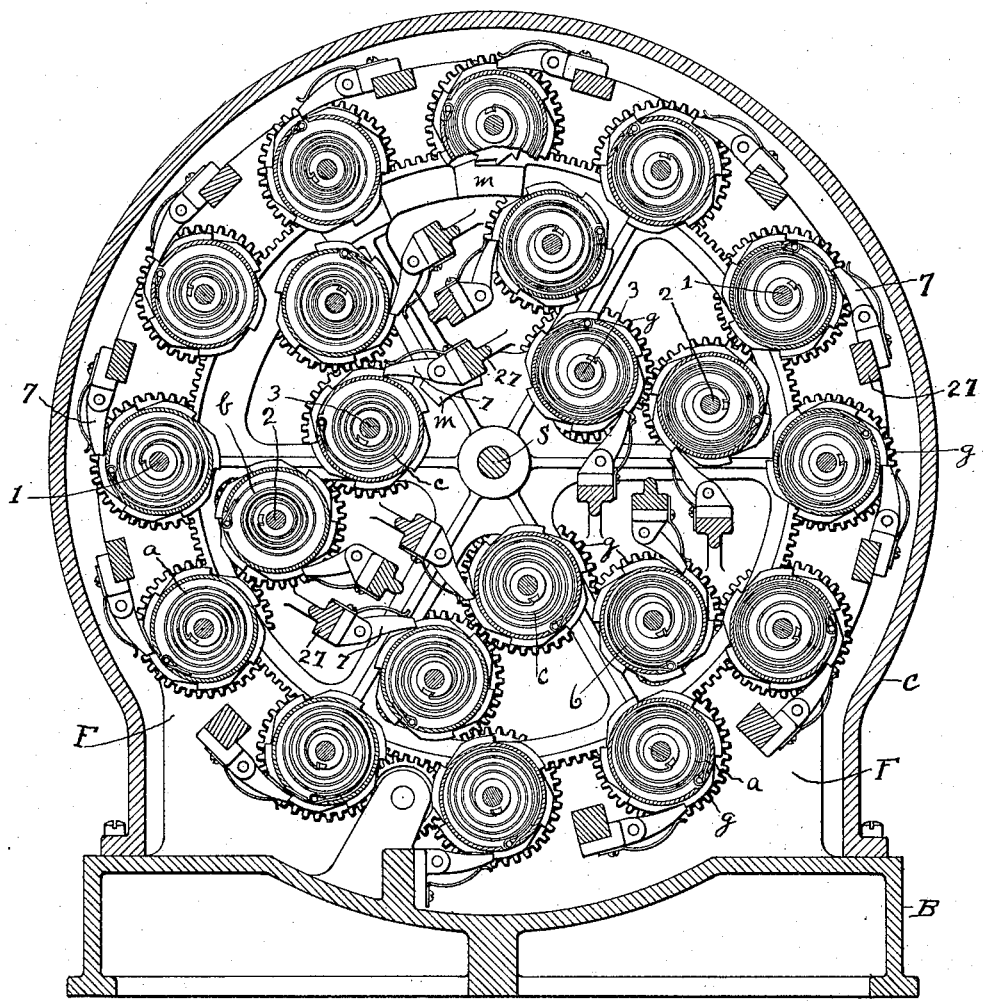
Figure 3:
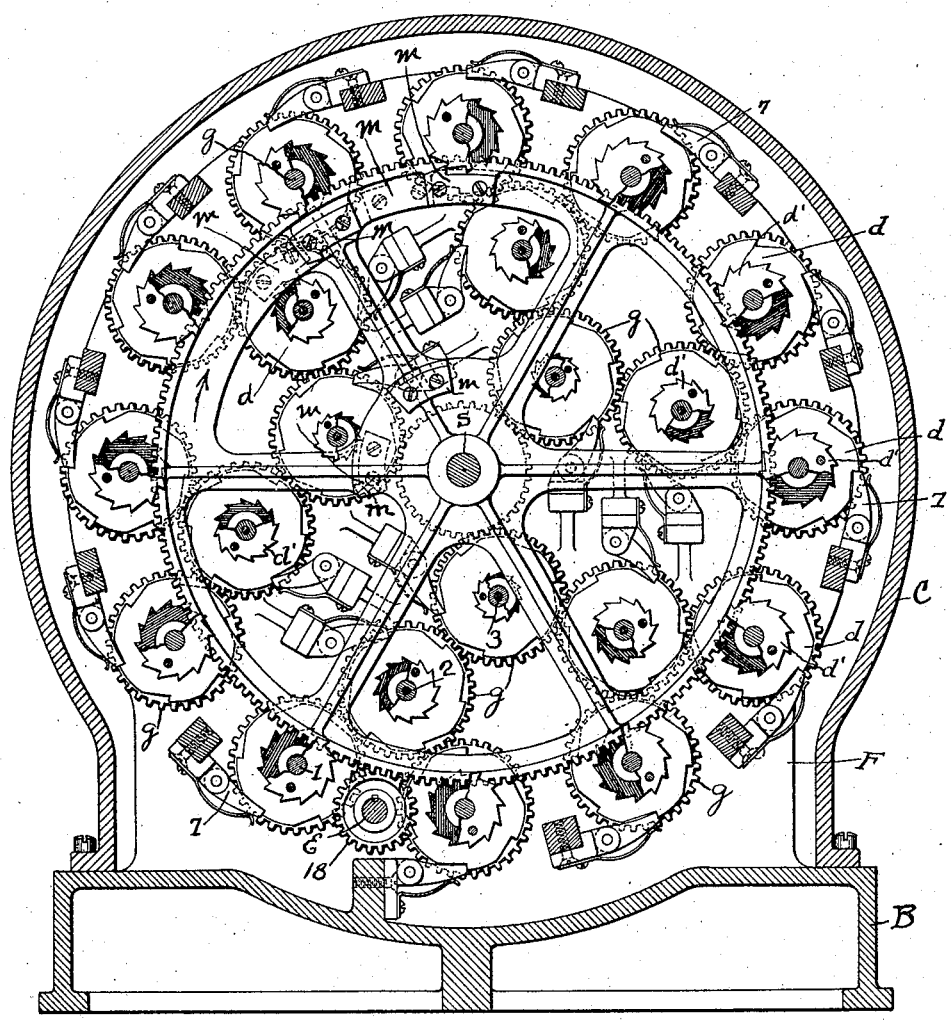
Figure 4:
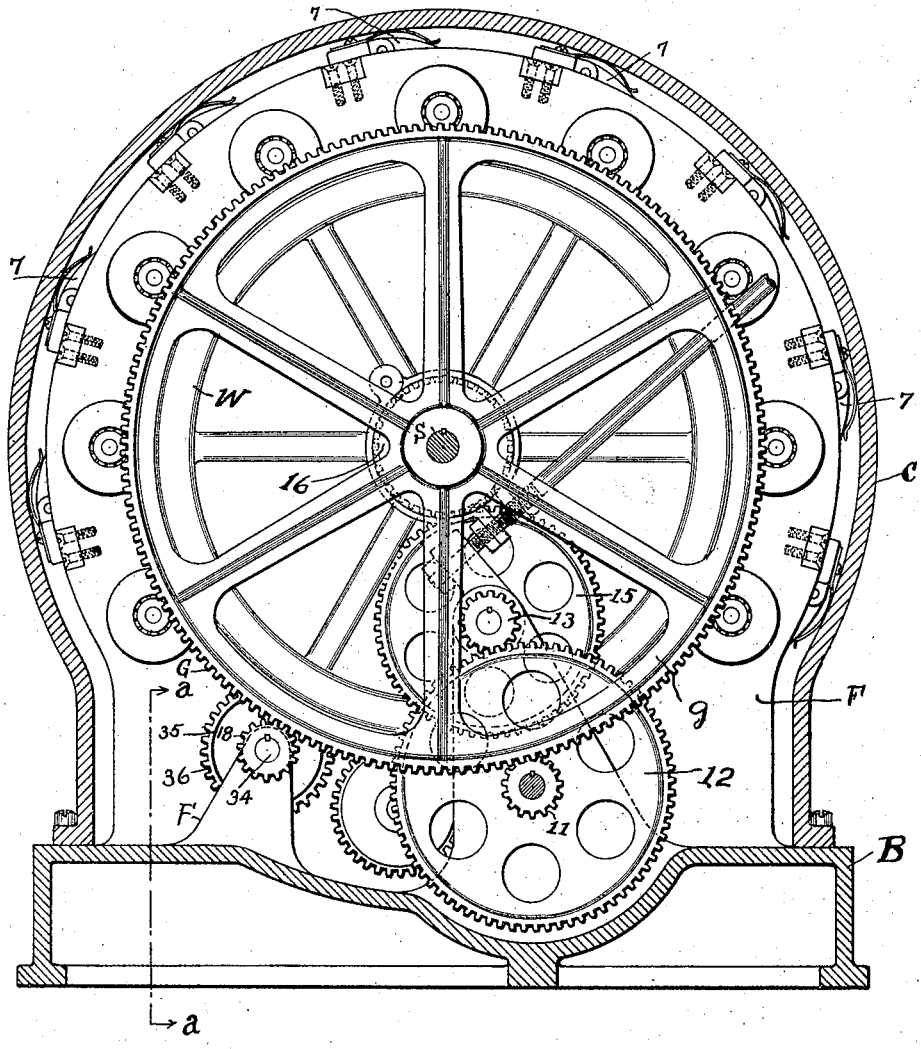
Figure 5:
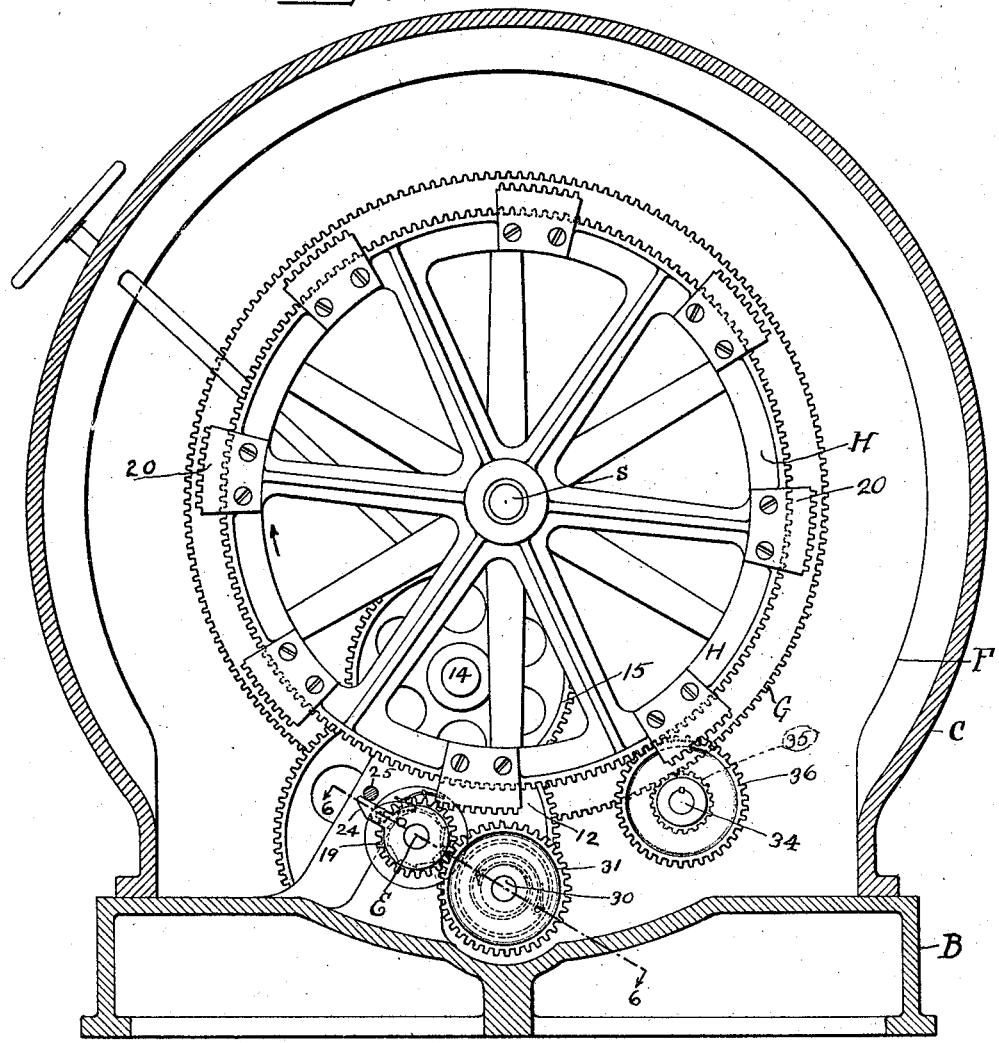
Figure 6:
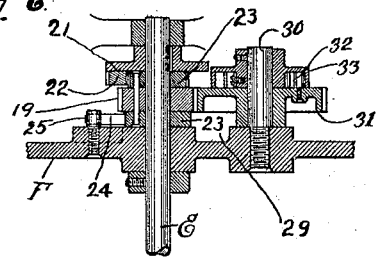

This invention relates to a multiple spring power machine, and in the accompanying drawings, Figure 1 is a sectional elevation of the machine on the line of the main shaft, and Fig. 1ª is a detail of operating means hereinafter fully described. Fig. 2 is a sectional elevation at right angles to Fig. 1 and on line 2—2 on said figure. Fig. 3 is a sectional elevation on line 3—3, Fig. 1. Fig. 4 is a sectional elevation on line 4—4, Fig. 1. Fig. 5 is a sectional elevation on line 6—6, Fig. 1 and Fig. 6 is a sectional plan substantially on line 6—6, Fig. 5.

The invention as thus shown represents a multiple spring form of the invention set forth in more simple forms in several other of my applications for Letters Patent, as for example, Ser. No. 809,851, in which there are a series of circularly disposed power springs with two springs on a single shaft acting independently, and Ser. No. 849,232, in which there are two springs on a given shaft in one piece acting one through the other. In the present embodiment there are three sets of circularly disposed power springs and shafts about the main or driven shaft, and all said power springs are geared together and coöperate in delivering their combined power to the said driven or main shaft through pinions or gears thereon, as will presently appear. In other words, in the applications above referred to the springs therein correspond to the outer circle or series of springs herein and there are transmitting gears or idlers interposed to communicate the power to the main shaft, but no springs are associated with said transmitting gears. In the present construction there are no idlers or idle gears, as such, in the transmitting mechanism, and all gears have associated and contributory springs and all without materially enlarging the area occupied by the machine.

As a whole the motor is inclosed in casing C on base B, and there are upright portions on said base here and there of varying elevation according to the needs of the parts supported thereon and which constitute an internal frame work generally designated by F. Otherwise the mechanism is supported on or by casing C.

S represents the main or driven shaft to which all the power of the springs is communicated and from which all used power is taken. The several spring power shafts are designated by 1, 2 and 3, successively, from the outside or outer circle inward toward the center or inner circle, and the springs on said shafts are designated by *a*, *b* and *c* respectively, in the order of their shaft numbers.

All the springs *a* in the outer series are in duplicate on a single shaft 1, while all the intermediate springs, *b* and *c*, are on short individual shafts. Each spring also has its own housing *h* to which the outer end of the spring is secured while the inner end is fixed to the hub of a ratchet disk *d*, having a pawl 7 to engage therewith and hold the windings imparted by wheel D. The winding occurs through wheel D having teeth or projections *m* at its sides engaging on toothed wheels *d'* fixed on the side of ratchet wheels *d*, as hereinafter more fully described. The said teeth *m* are at intervals on both sides of said wheel D, and at different distances from its center according to the positions of the springs to be wound and are adapted to engage the toothed wheels *d'* successively and thus rotate the ratchet disks *d* and wind the springs fixed at their inner ends on the hubs thereof, as above set forth.

The power of the springs is applied through the respective drive gears *g* on the respective spring shafts, and said gears are fixed on the hubs of the said housings and transmit through said housings and said gears. However, in the outer series or circle of springs the housing is fixed on shaft 1 and single gear *g* rotates with said shaft, while the short shafts 2 and 3 are fixed in the frame supports F and do not rotate and the gears *g* are splined or otherwise secured to the hub of housing *h*. A single gear on power shaft 1 communicates the power for both springs thereon because both spring housings are affixed to the shaft. In operation, therefore, the power of the springs is cumulative from one set to the other through the gears *g*, which mesh through from the outer one to the gear or pinion 8 on shaft S, and there is one pinion 8 for all the gears at each side of the winding wheel D. The said wheel D is free to turn on shaft S for rewinding purposes and has a line of mechanism to actuate the same at intervals and progressively as hereinafter fully described. The said shaft S has a band wheel 10 on its outer end from which power is taken, and all the power of the machine is available at this point except the portion required for rewinding the springs. It is planned to keep this latter use of power down to the minimum, and to this end I employ a fly-wheel, as is also shown in my applications above referred to and which therefore is not regarded as a novel feature in this case except as to its novel relations to or in the rewinding mechanism. Thus, the shaft S has a large gear wheel G splined on one end thereof within casing C and which meshes with a pinion 11 on a short shaft 9 on which is splined a gear 12 by the side of said pinion. The said gear in turn meshes with a pinion 13 on one end of a short shaft 14 rotatable in frame or post F and which has a gear 15 fixed on the other end thereof on the opposite side of said member or post F. This latter gear, 15, meshes with a comparatively small gear 16 fixed on the hub 17 of fly wheel W. The said wheel is rotatable in ball bearings on shaft S and driven by the line of mechanism proceeding from gear G as just described, so that a very high rate of speed is imparted to said fly wheel.

In this machine I employ a gear wheel H at the side of fly wheel W on shaft S and free to rotate thereon, and said wheel is adapted to impart movement to the rewinding mechanism in which gear D is the ultimate rewinding member. The said mechanism comprises a counter-shaft E supported in the main frame F and carrying a pinion 18 at one end meshing with gear D and another pinion 19 at its other end engaged at intervals by segments 20 on one side of the said gear wheel H. The said segments are eight in number, as shown, and uniformly spaced apart, and while the wheel H is under constant rotation the segments 20 at the other end of said line of mechanism operate with intervals of pause or rest, though these intervals are comparatively brief. The said shaft E, Fig. 6, has a disk 21 splined thereon which carries a pawl 22 adapted to engage a ratchet wheel 23 free on said shaft next to said disk, and a pin or bolt is run through said ratchet wheel, the pinion 19 and a disk 29 at its side and ties said three parts rotarily together on said shaft. Disk 29 has an arm 24 adapted to engage a fixed stop 25 which limits the return rotation of said parts after they are carried forward together by one of the segments 20 on wheel H acting on pinion 19 and which represents the travel required of these parts to effect a winding of one of the several power springs. As to this it may be again noted that by staggering the said springs in respect to the axis of the machine, as seen say in Fig. 2, no two springs come into winding position at the same time, and each set or circle of springs has its own toothed actuating segment or projection $m$, Figs. 2 and 3, fixed on the side of wheel D according to the distance of said spring or series of springs from the center of rotation. The said toothed projections $m$ are on both sides of wheel D in successive positions, so as to wind first on one side and next on the other side and the teeth for the second series of springs project inward while all the others project outward, and all said projections are in one section of wheel D and all springs are regularly rewound with every rotation of said wheel. So, also, are there pawls 7 for each and all the said springs variously disposed radially and supported individually from or by projections 27 on the main frame.

Recurring, now, to shaft E, Fig. 6, it will be seen that as the pinion 19 and its two attached parts is rotated forward by wheel D a given distance the arm 24 on part 23 is carried downwardly accordingly and at the same time pawl 22 on disk 21 fixed on shaft E engages the said parts rotarily together and imparts rotation to shaft E and its pinion 18 which turns the rewinding wheel D. Then in the moment of pause and to restore the parts to normal, as in Fig. 5, I provide restoring mechanism consisting of a short shaft 30 set in frame F opposite shaft E and which carries a gear 31 meshing with pinion 19, and a spring 32 in housing 33 on said shaft is adapted to rotate with pinion 19, and a spring 32 in housing 33 on said shaft is adapted to rotate said shaft and gear 31 and turn the parts free on shaft E back to normal and with arm 24 in contact again with stop 25. This action is repeated with each actuation through one of the segments 20, as described. Farther back in the line of this operation we have the parts shown in Fig. 1ᵃ, Sheet 1, in which there is a shaft 34 supported from the base B and carrying a pinion 35 meshed by outer gear G, and on the other of this shaft is a gear 36 which meshes with and drives large gear H continually. Thus the rewinding wheel D is seen to be operatively related back to the said large wheel G and which has gear connections with the fly wheel W to rotate the same independently on shaft S. This enables me to utilize the momentum of the fly wheel as an auxiliary force in the rewinding operations, the momentum at the time finding its exercise in or through the mechanism which otherwise serves to impel said wheel. A brake wheel 40 is shown on shaft S with a friction brake 41 thereon.

Looking at the arrangement of the various springs and their transmitting mechanisms as seen in Fig. 3, it will be observed that in a sense the said mechanisms are in three groups of seven springs in each group and all said springs delivering their power cumulatively through the associate gear of the inner series in that group. It will be seen, also, that there are twenty-four springs in the outer circle, two on each shaft, twelve single gears in the second series or circle on independent mountings and six in the inner series. However, from another point of view, as on a plane that cuts the outer springs apart, as in Fig. 2, there are twelve, six and three springs in coöperating relations through their gears on each side of the rewinding wheel D with each of the three inner gears of said groups delivering the combined power of the springs in the respective groups.

By the term "cumulative" as used herein I mean the coupling up of the gear connections between springs at different distances from the main shaft so that each outer spring adds its power to the spring nearer in through the gear therewith, until, say in the present machine, the power of springs $a$, $b$ and $c$ are added together on the gear through which they engage the main shaft. As above described, the cumulative force of twenty one springs is represented in each of the three inner gears $g$ at the sides of wheel D engaging the main shaft or the gears thereon.

What I claim is:

1. In a spring power motor, a main shaft, a series of power springs disposed about the same at different distances from said shaft, rewinding mechanism associated with each spring and a winding wheel provided with means at its side to engage said rewinding mechanisms successively and singly.

2. In a spring power motor, a main shaft and power springs disposed in different circles therefrom and shafts on which said springs are mounted, the shafts for the outer circle of springs having a plurality of springs thereon and the shafts for the other circles having single springs, and gears connecting all said shafts in groups, said shafts geared together in groups on the main shaft.

3. In a spring power motor, a main shaft and a series of springs disposed about the same on different radial lines and at different distances from said shaft and rewinding mechanism for each spring, in combination with a rewinding wheel and means to operate the same intermittently, said wheel provided with teeth on its side at different distances from its center and at different positions radially and adapted to engage with said rewinding mechanisms successively and singly.

4. In a spring power motor, a main shaft, a series of power springs disposed in a plurality of circles about said shaft and provided each with rewinding mechanism, in combination with a rewinding wheel and means thereon adapted to engage said rewinding mechanism, a gear wheel fixed on said shaft and a line of mechanism driven by said gear wheel and in actuating relations with said rewinding wheel, the said line of mechanism comprising a fly-wheel adapted to contribute its momentum to the said rewinding mechanism.

In testimony whereof I affix my signature in presence of two witnesses.

AUGUST C. RUTZEN.

Witnesses:
H. T. FISHER,
GEO. E. KRICKER.

Copies of this patent may be obtained for five cents each, by addressing the "Commissioner of Patents, Washington, D. C."